United States Patent
Zhang et al.

(10) Patent No.: US 8,705,120 B2
(45) Date of Patent: Apr. 22, 2014

(54) METHODS AND SYSTEMS FOR ACHIEVING PRINT UNIFORMITY USING REDUCED MEMORY OR COMPUTATIONAL REQUIREMENTS

(75) Inventors: Yequing (Juliet) Zhang, Webster, NY (US); Daniel E. Viassolo, Schenectady, NY (US); Susan J. Zoltner, Newberg, OR (US); Howard A. Mizes, Pittsford, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/786,694

(22) Filed: May 25, 2010

(65) Prior Publication Data

US 2010/0231942 A1 Sep. 16, 2010

Related U.S. Application Data

(62) Division of application No. 10/922,316, filed on Aug. 19, 2004, now Pat. No. 8,305,660.

(51) Int. Cl.
*H04N 1/46* (2006.01)
*H04N 1/60* (2006.01)

(52) U.S. Cl.
USPC ............ 358/1.9; 358/504; 358/296; 358/518; 358/520; 358/3.01; 399/49; 399/50; 399/39

(58) Field of Classification Search
USPC ........ 358/504, 296, 518, 520, 1.9; 399/49, 50
See application file for complete search history.

(56) References Cited

U.S. PATENT DOCUMENTS

| | | | | |
|---|---|---|---|---|
| 4,553,033 A | | 11/1985 | Hubble, III et al. ........... | 250/353 |
| 5,749,020 A | * | 5/1998 | Mestha et al. .................. | 399/49 |
| 5,946,452 A | * | 8/1999 | Spaulding et al. ............. | 358/1.9 |
| 5,963,244 A | | 10/1999 | Mestha et al. ................. | 347/251 |
| 6,021,285 A | | 2/2000 | Mestha et al. .................... | 399/9 |
| 6,351,320 B1 | * | 2/2002 | Shin ................................ | 358/1.9 |
| 6,469,805 B1 | * | 10/2002 | Behlok .......................... | 358/1.9 |
| 6,636,628 B1 | | 10/2003 | Wang et al. .................... | 382/167 |
| 6,654,150 B1 | * | 11/2003 | Rozzi ............................. | 358/520 |
| 6,717,700 B1 | * | 4/2004 | Sanderson et al. ........... | 358/3.21 |
| 6,760,056 B2 | * | 7/2004 | Klassen et al. ................ | 347/251 |
| 7,206,082 B2 | * | 4/2007 | Barry et al. ................... | 358/1.13 |
| 2003/0147660 A1 | * | 8/2003 | Shim et al. ...................... | 399/49 |

FOREIGN PATENT DOCUMENTS

| EP | 1156666 A2 | 11/2001 | .............. H04N 1/60 |
|---|---|---|---|
| EP | 0597571 B1 | 5/2002 | ................ G06T 9/00 |

* cited by examiner

*Primary Examiner* — Steven Kau
*Assistant Examiner* — Quang N Vo
(74) *Attorney, Agent, or Firm* — Kermit D. Lopez; Luis M. Ortiz; Ortiz & Lopez, PLLC

(57) ABSTRACT

Engine response curves (RCs) can be used for streak compensation for printed documents. A feedback control paradigm can be included to effect RC compensation. Singular Value Decomposition (SVD) can be used to represent each RC in the collection of spatial RC data as a linear combination of basis vectors. RCs are approximated by selecting the first few basis vectors, the approximation aiding in noise rejection and reducing computation in the controller by reducing dimensionality of the RC data from gray levels to the number of SVD bases selected. An optimal subset of RCs is selectable from the set of approximated RCs by clustering the SVD weights, the clustered SVD weights producing TRCs that span all engine response RCs generated by a printer. Compensation RCs are constructible using reduced number of bases and clustered SVD weights.

16 Claims, 6 Drawing Sheets

METHODS AND SYSTEMS FOR ACHIEVING PRINT UNIFORMITY USING REDUCED MEMORY OR COMPUTATIONAL REQUIREMENTS

CROSS-REFERENCES TO RELATED APPLICATIONS

This application is a divisional of prior application Ser. No. 10/922,316, filed Aug. 19, 2004 now U.S. Pat. No. 8,305,660, herein incorporated by reference.

FIELD OF THE INVENTION

The present invention is generally related to image streak compensation in printed material. More particularly, the present invention is related to methods and systems achieving print uniformity using reduced memory or computational requirements while minimizing the effects of printer noise and measurement noise.

BACKGROUND

Image non-uniformity has long been a difficult problem for most digital marking processes. Streaks are one-dimensional image defects that generally run parallel to the process direction in a printed image. They are typically caused by the undesirable non-uniform response of some components in a marking engine. Defects in the subsystems of a xerographic printer, an inkjet printer, or similar image forming system may give rise to visible streaks in a printed image. For example, photoreceptor scratches, contamination of the charger wire, non-uniform LED imager and Raster Output Scanner (ROS) spot size variations are examples of subsystem problems giving rise to rendered image streaking in a xerographic marking engine. Bands are also one-dimensional image defects that generally run perpendicular to the process direction in a printed image. They are typically caused by time-varying performance of a marking subsystem such as nonuniform velocity of the photoreceptor drive out-of-roundness of development rolls, and wobble of the ROS polygon mirror. In a uniform patch of gray, streaks and bands may appear as a variation in the gray level. In general, "gray" refers to the optical density or area coverage value of any single color separation layer, whether the toner is black, cyan, magenta, yellow or some other color. FIG. 1 is an exaggerated illustration of streaking as it would appear in a printed document.

Another way to describe what causes image streaking is that the marking tone reproduction curve (TRC) of the printer is a function of position in the cross-process direction. For example, a light streak gives lower print densities as a function of input gray level when printing over the streak than when printing away from the streak.

Most of the existing methods to mitigate streaks are "passive"; i.e., they do not employ sensing and compensating for non-uniformities, but rather, they require using subsystem components that operate in a very uniform manner (e.g., a more accurate optical system for the ROS). As a result, manufacturing and maintenance costs increase dramatically in order to cope with more stringent image quality requirements. One method of reducing streaks is to design and manufacture the critical parameters of marking engine subsystems to tighter specifications. Such precision manufacturing, however, will often prove to be cost prohibitive.

It has been proposed to modify the digital input image with spatially varying digital image processing TRCs, to compensate for streaks. Spatially dependent TRCs are provided that compensate for a non-uniform engine response so that each gray level throughout target space is printed at desired values. Processes have been implemented that accurately measure engine response curves "ERCs." Iterative methods such as feedback control shown in FIG. 3 (labeled as prior art), have been used to compute a suitable compensation for overcoming inaccuracies, adjusting color and reducing noise. Prior image processing solutions, however, presented fundamental concepts of streak compensation by providing detailed measurement and iteration methods, but did not develop details for an optimal method of selecting a set of TRCs that is practical and cost effective for common printing image path architectures.

An TRC may be measured by printing patches of different bitmap area coverage. In some digital image processing applications, the reflectivity of a patch of gray is measured with a toner area coverage sensor. This manner of operation over a toner area coverage sensor is described in U.S. Pat. No. 4,553,033. Toner area coverage sensors are typically designed with an illumination beam much larger than the halftone screen dimension. This large beam, however, does not provide the resolution for the toner area coverage sensor to be useful as a sensor for the narrow streaks that may occur for poorly performing subsystems.

U.S. Pat. No. 6,021,285 describes an image quality control apparatus that controls the quality of xerographic images formed by a xerographic imaging system onto a recording medium. A sensor provides signals to the xerographic imaging system for quality control malfunctions. The image quality control apparatus includes a controller device in communication with the xerographic imaging system. The controller includes a data collection device, a determining device and an input generating device. The data collection device collects and processes sensor data received from the at least one sensor while the at least one sensor is operative. The determining device determines whether the at least one sensor malfunctions. The input generating device generates a controller input signal by using the sensor data collected by the data collection device and provides the controller input signal to the xerographic imaging system to control quality of the xerographic images when the determining device determines that the at least one sensor has malfunctioned.

U.S. Pat. No. 5,963,244 describes the recreation of a TRC by providing a look up table. The look up table (LUT) incorporates a covariance matrix of elements containing n tone reproduction samples. A matrix multiplier responds to sensed developed patch samples and to the LUT to reproduce a complete TRC. A controller reacts to the reproduced TRC to adjust machine quality.

U.S. Pat. No. 6,636,628 describes an iteratively clustered interpolation (ICI) algorithm for use with irregularly sampled color data to develop a structured inverse. The algorithm is proposed to improve device independent color across devices, such as, for example, printers, scanners and displays.

U.S. Pat. No. 5,749,020 describes fundamental machine functions such as the TRC that need to be divided into regions of smaller units so that each unit can be interrelated to some aspects of the internal machine process.

U.S. patent application Ser. No. 09/738,573 by Klassen et al discloses a method for compensating for streaks by introducing a separate TRC for each pixel column in the process direction, which requires ample computing resources and memory. Using the Klassen invention, a compensation pattern is printed and then scanned to first measure the ideal TRC, and then streaks are detected and measured. The TRCs for the pixel columns associated with the streak are then modified to compensate for the streak.

The foregoing patent references are commonly owned by the assignee of the present invention and are incorporated herein by reference in their entirety. What is still apparently needed in the art are methods and system that can address shortcomings in achieving print uniformity, e.g., by reducing image streaks, while requiring less system resources and time. Given the shortcomings in the art for providing cost effective image streak compensation systems and methods, the present inventors now provide a solution for effectively and efficiently overcoming image defects.

SUMMARY OF THE DISCLOSURE

The term Response Curve ("RC") as used herein shall refer equally to either an "Engine Response Curve" (ERC) or a "Tone Reproduction Curve" (TRC). It is necessary to be able to refer to either of these curves equivalently for a complete understanding of the present invention because the curves are approximately inverse; therefore, many operations relevant to the present invention can be performed on either curve-type.

The present invention provides methods and systems that achieve print uniformity (i.e., streak compensation) using less memory or computational requirements to minimize the effects of streaks, printer noise and measurement noise.

In accordance with a feature of the present invention, methods are provided to compress the total collection of spatial RCs required for streak compensation to a smaller set that is optimal for given memory and computation constraints. The methods can be used in real-time image paths with a uniformity correction control loop.

A method in accordance with an exemplary embodiment of the present invention implements uniformity compensating RCs for a digital printer that includes the steps of (a) measuring a collection of RCs over the space of desired uniformity, (b) selecting a subset of basis vectors that represent the RCs, and (c) applying to a digital image uniformity compensating RCs that are derived from the subset of basis vectors.

In accordance with another feature of the present invention, the uniformity compensating RCs are calculated as a subset of orthogonal basis vectors from the RCs.

In accordance with another feature of the present invention, the uniformity compensating RCs are selected based on a calculation of weights associated with the basis vectors selected from the RCs.

In accordance with another embodiment of the invention, the method of the invention includes the step of: (d) Measuring the ERC after applying the compensation TRC, correcting any residual error, and repeating this step one or more times.

In accordance with another embodiment of the invention, the method of the invention includes step wherein RCs are used to cause change in the gray level required to result in printing at overall system aim RCs.

In accordance with another feature of the present invention, aim RCs are derived from at least one of the average of: all RCs over a space of desired uniformity, and all RCs in the vicinity of where other process controls sense a printer response to that used to maintain print density over time.

In accordance with another feature of the present invention, the orthogonal basis vectors are one of: data-dependant basis vectors, Singular Value Decomposition (SVD) and Principal Component Analysis (PCA).

In accordance with another feature of the present invention, Discrete Cosine Transform (DCT) is used to calculate basis vectors.

In accordance with another feature of the present invention, the subset of basis vectors are selected from a larger set of basis vectors according to the percent variability of the ERC contributed by each basis vector.

In accordance with another feature of the present invention, the uniformity compensating RCs are applied to the digital image as RC look-up tables (LUTs), where the LUTs are generated by a linear combination of the subset of basis vectors.

In accordance with another feature of the present invention, a pixel-position-RC LUT is used to select a RC LUT for a pixel within the digital image.

In accordance with another feature of the present invention, a pixel-position-RC LUT uses the pixel column of a given pixel in the digital image as the index into the LUT.

In accordance with another feature of the present invention, a pixel-position-weight LUT is used to select a basis vector weights for a given pixel within the digital image.

In accordance with another feature of the present invention, the basis vectors weights used for linear combining are clustered weights that are fewer in number than the unclustered weights.

In accordance with another feature of the present invention, the uniformity compensating RCs are applied to the digital image as arithmetic operations forming a linear combination of basis vectors.

In accordance with another feature of the present invention, target RCs are applied that vary in time to compensate for time-varying engine RCs. The present invention also can be made compatible as a process that applies RCs at regular time intervals to maintain average (across space) or overall stability over time.

In accordance with another exemplary embodiment, the present invention can also be made to perform both the temporal stability and spatial stability functions. For example, when two or print engines are to be made consistent in their overall system tone reproductions, at the high density limit ($D_{max}$), a machine that is producing a light $D_{max}$ for a given maximum digital image value cannot be given a larger digital image value to produce the average $D_{max}$ determined from two or more machines. In that situation the minimum $D_{max}$ (min across the two or more machines) has to be used because all the machines can achieve that level. If machines are physically separated, they are often referred to as a printing cluster. If the machines are physically combined, such as in one box, this configuration is referred to as Tightly Integrated Parallel Printing (TIPP). The min($D_{max}$) concept is considered important for uniformity across such print engines.

With another aspect of the present invention, by applying Level 3 controls to multiple engines within a TIPP architecture, the engines can be controlled to a common $D_{max}$. Therefore, it is a feature of the present invention to define the $D_{max}$ for such a control setting as well as the spatial uniformity setting mentioned above.

In accordance with another exemplary embodiment, the min($D_{max}$) concept can be used within one print engine. If one portion of a page is printing with a $D_{max}$ that is too light, it cannot be made darker by applying an RC to increase the digital value because the digital value is already at the maximum by definition of $D_{max}$. In this case the aim RC of the single printer can be set to have a $D_{max}$ that is achievable by all points in a printer (i.e., min($D_{max}$)).

In accordance with another feature of the present invention, the aim RC $D_{max}$ is the maximum density achievable for the weakest responding engine in multiple engine printing.

In accordance with another feature of the present invention, the aim RC $D_{min}$ is the minimum density achievable for the engine with the poorest capability for developing small halftone dots.

These and other features and advantages of the invention are described in, or are apparent from, the following description of various exemplary embodiments of systems and methods according to this invention.

BRIEF DESCRIPTION OF THE DRAWINGS

Various exemplary embodiments of systems and methods according to this invention will be described in detail with reference to the following figures wherein.

DETAILED DESCRIPTION OF EXEMPLARY EMBODIMENTS

Figure 1:
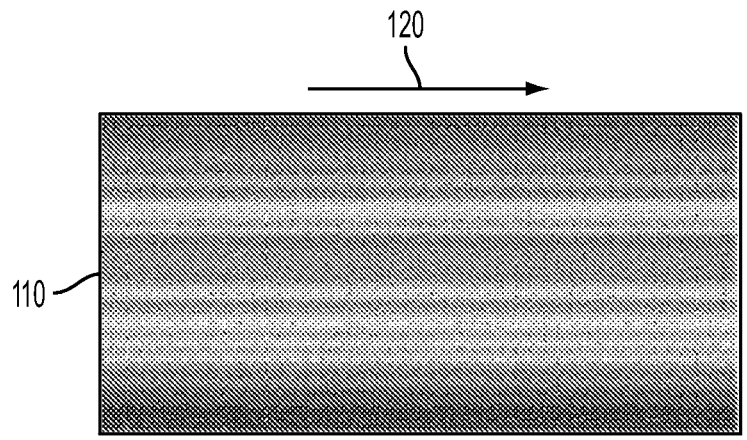
FIG. 1 illustrates an image that contains streak print defects.

Using methods of the present invention the number of spatial RCs required for streak compensation are reduced, yet real-time implementation of streak compensation becomes much simpler and more cost-effective. Also, the present invention can achieve better uniformity across pixel columns within a marking engine and across multiple marking engines, and can converge faster than previous spatial RC methods. The compensation techniques described herein can be applied to both color and monochrome image forming devices.

As used herein, the term "printed gray level" in reference to a print indicates an amount of reflectance due to an amount of coverage of material between zero and 100% for the allowable range on the printed surface, although in general this material may be colored any desired color. The printed gray level may be represented as a percentage, or some optical unit (e.g., lightness).

An "input gray level" is typically a digital value represented as an integer between 0 and 255 that is sent to the marking engine from a computer, an input scanner or other image data source. The input gray level is used to drive the print engine to produce a printed gray level.

Used herein, an "actual gray level" is the response of a sensor measuring the printed gray level of the printed image. For a given input gray level, the actual gray level can be a function of distance in the cross process direction giving rise to a streaky, nonuniform appearance. More generally, for a given input gray level, the actual gray level can be a function of spatial position, time, or print engine within a printer cluster giving rise to a nonuniform appearance of a desired space of uniformity.

The term "desired space of uniformity" shall refer to spatial extent, as in x and y coordinates, time, multiple print engines, and multiple imagers. The spatial extent can be addressed directly as x and y position, or less costly column and row implementations can be realized, for streaks and bands, respectively. The temporal aspect comprises the uniformity of a print engine as it operates during a print job, or over a longer period of time that may comprehend several jobs. The multiple print engine aspect includes Tightly Integrated Parallel Printing (TIPP) architectures, networked printing clusters, and print engines that may be coupled through any means of data transfer. The multi-imager aspect comprehends multiple print heads that may be used to print an image. "Desired spatial of uniformity" in compensating for streaks due to the ease of teaching this spatial configuration are described below. The concepts readily extend to multiple spatial dimensions, time, multiple print engines, and multiple imagers.

The "desired gray level" is defined as the response of the sensor to what the marking engine was designed to print. The desired gray level is independent of position for a uniform gray strip, independent of time, and other dimensions within the space of desired uniformity. For the purposes of uniformity correction, the desired gray level can be defined to be the average of all the actual gray levels. The desired gray level can also be a target value that the marking engine is designed to print. In addition, the desired gray level can be the engine response curve at the location of point sensors used for process controls.

The term "Tone Reproduction Curve" may be used in various ways in the field. To avoid ambiguity in the teachings below clear, we define several related terms. An "Engine Response Curve" (ERC) is the relationship between actual gray level and modified input gray level. A Tone Reproduction Curve is a digital image processing module that converts an input gray level to a modified input gray level that can be used to drive a printer. We shall use the term Response Curve (RC) or Response Curves to denote either ERCs or TRCs because, when performing uniformity compensation, much of the analysis may be performed on either the ERC or a TRC due to their approximate inverse relationship. We shall use the term "uniformity compensating RCs" for RCs, either ERCs or TRCs, used in the analysis or processing of gray level data for the purposes of uniformity compensating.

The desired actual gray level, as a function of input gray level, defines an intended engine reproduction curve (which will also be referred herein as an "RC"). The actual gray level as a function of the input gray level defines a local RC. A local RC exists for each pixel location in the printed image in the cross-process direction. Thus, for example, a 600-spi printer that is 11 inches wide would have one desired tone reproduction curve and 6600 (600×11) local RCs, one for each of the 6600 different pixel locations.

FIG. 1 illustrates an image patch 110 having a single gray level value that contains a number of streak defects 120 run parallel to a process direction. Each streak defect extends along a process or slow-scan direction, while the various different streak defects are adjacent to each other along the cross-process or fast-scan direction. The magnitude of the streaking or the difference in toner intensity is a function of cross process position. All pixels in a column that are parallel to the process direction and that are a given distance from a reference location will experience a same shift in intensity due to the streak defect. In various exemplary embodiments of the invention described herein as systems and methods, streaks or improper toner density regions that run the length of the process direction in a document and have a constant lighter or darker intensity than adjacent regions of the same intended intensity are compensated for prior to actual printing of the document.

Figure 2:
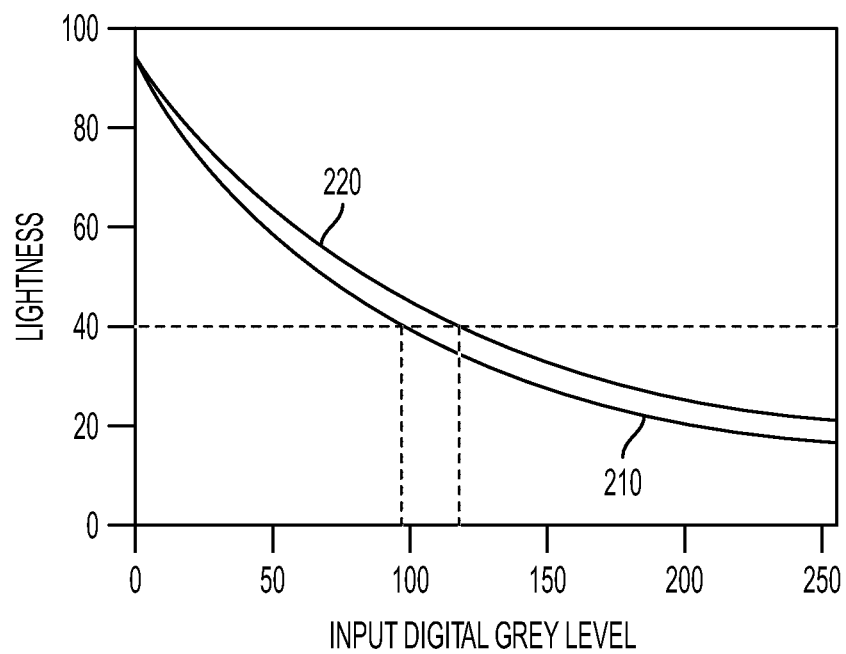
FIG. 2 is a graphical illustration of an ideal engine reproduction curve and an actual engine reproduction response for a single pixel location along the cross-process direction.
Figure 3:
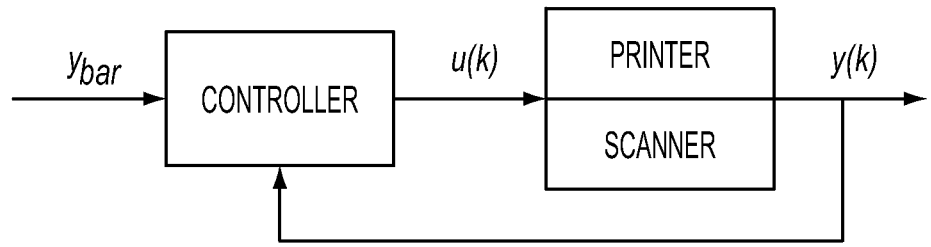
FIG. 3 is a prior art illustration of image processing system modules configured to incorporate feedback control for executing image adjustment and defect correction.

FIG. 2 is a graph of two curves that show lightness, a measure of the printed toner density, as a function of the input gray level. The ideal or intended ERC 210 indicates the output lightness as a function of input gray level in all pixel columns if no streak defects are present. The actual ERC 220 is an example of actual output lightness as a function of input gray level for a pixel column which experiences a streak defect. If the printer response at this pixel column were accurate, the plot of the actual gray level versus input level would match the plot of the ideal or intended ERC 210 at all positions. Deviations of this local ERC 220 from the ideal or intended ERC 210 quantify the degree of streaking for this pixel location at all gray levels.

Based on the ideal ERC 210, if an image portion having an actual gray level output of 40 is desired, under ideal conditions, to obtain the desired actual gray level output at this pixel location, a xerographic or electrographic image forming system would need to print that image portion using an input gray level of 117. Based on the actual ERC 220, if the image portion having a gray level output of 40 is desired, and input level 117 is used, actual printed gray level would be 36, which is in error with respect to the intended level. To achieve a uniform lightness of 40, the input gray level value for the pixel location experiencing the streak defect must be lowered to a value 97 from the value 117, which can be determined from the actual ERC at the streak location and the ideal ERC. The modification of digital input gray levels can be performed by using a TRC.

In one implementation of a uniformity compensating TRC, the input gray level is adjusted for each pixel by modifying the input gray level for that pixel by a compensation matrix. The compensated gray level is selected depending on the exact pixel location and the input level. The uniformity compensating tone reproduction curve is then applied to the input image or gray level value to convert from the input gray level value to a modified uniformity corrected printer dependant gray level value. Consider the application of this uniformity compensating process an 11" page, having 600 spots/inch (spi), with the goal of streak compensation. 6600 of the above RCs would need to be stored and applied. Hence, to apply this uniformity compensation method across a broad spatial extent, across multiple engines, or, in general, across a desired space of uniformity, it can be appreciated that systems costs, such as computations, memory and time, can be excessive.

Figure 4:
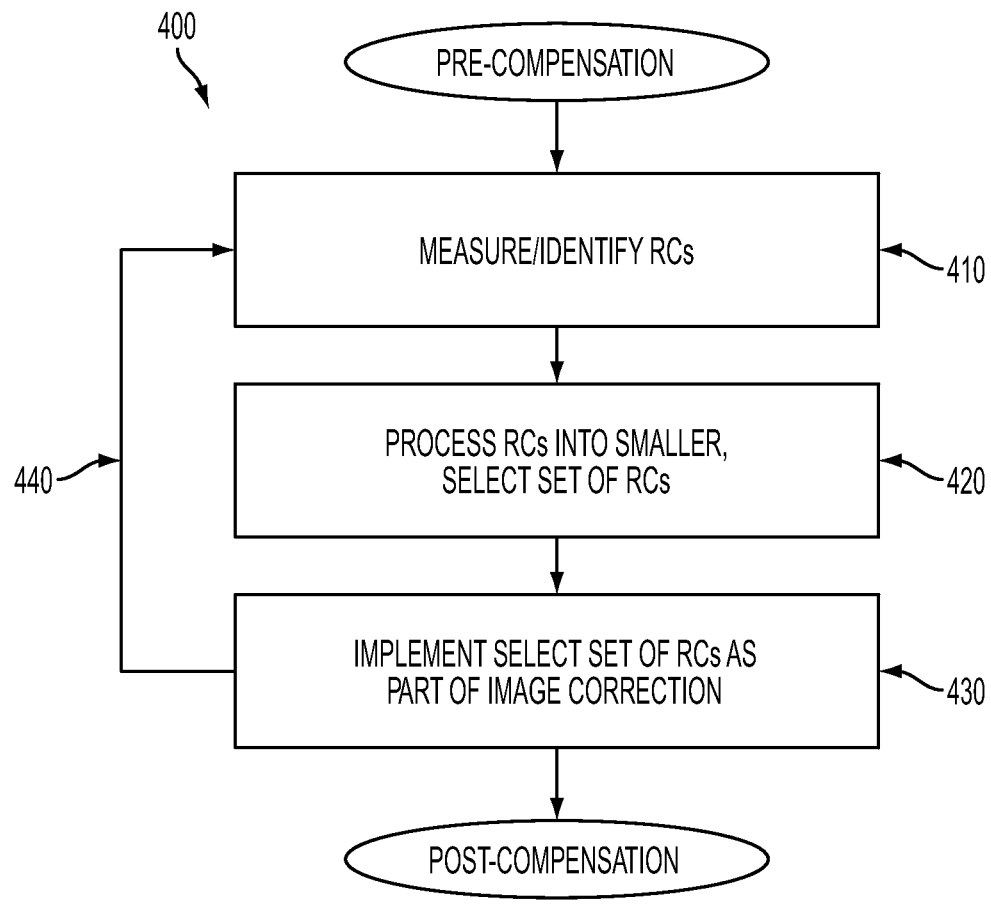
FIG. 4 illustrates a flow diagram of steps taken to implement a preferred embodiment of the present invention focusing on RC reduction.

The present inventors saw the need to provide methods and systems for suppressing nonuniformity that occurs in the form of image streaks and otherwise with a reduced commitment in memory and associated processing. Referring to FIG. 4, a flow chart 400 illustrates a method in accordance with an exemplary embodiment of the present invention. The method implements uniformity compensating RCs for systems, such as a digital printer, that includes measuring and/or identifying a collection of RCs over the space of desired uniformity as shown in step 410. To do so the local RC is sensed from either a scanned print or on paper or on a receiving member internal to the printer using a linear array sensor.

Noise in a scanner-based measurement or linear array-based measurements can occur both from printer noise (graininess, mottle, etc.) and noise in the measurement device. The local RC measurement can exhibit fine structure as a function of gray level that is not due to the true engine RC, but instead is due to noise sources. In accordance with another distinct feature of the present invention, the total collection of spatial RCs required for streak compensation are processed as shown in step 420 into a smaller, select set that rejects printer noise and scanner noise and is further optimal for given memory and computation constraints. The select set of RCs are developed by utilizing a controller associated with an image processing system to calculate a subset of orthogonal bases vectors from the measured/identified RCs. As shown in step 430, the select set of RCs is then implemented as digital image uniformity compensating RCs that are based on the subset of basis vectors. It should be appreciated that the process can optionally be repeated using a feedback control loop 440 until suitable compensation is achieved.

The invention includes processing wherein RCs are used to cause change in the gray level required to result in printing at overall system aim RCs. Aim RCs are derived from at least one of the average of: all RCs over a space of desired uniformity, and all RCs in the vicinity of where other process controls sense a printer response to that used to maintain print density over time. Target RCs are applied that can vary in time to compensate for time-varying engine RCs. The present invention also can be made compatible as a process that applies RCs at regular time intervals to maintain average (across space) or overall stability over time.

The select set of RCs that are implemented as digital image uniformity compensating RCs can be based on the subset of basis vectors. Basis vectors are one of: fixed orthogonal basis vectors, such as Discrete Cosine Transform (DCT); data-dependant basis vectors, such as Singular Volume Decomposition (SVD); and Principal Component Analysis (PCA). The subset of basis vectors are selectable from a larger set of basis vectors according to the magnitude of the data matrix eigen value corresponding to each basis vector. A large data matrix eigen value accounts for a large percent variability in ERC data.

The uniformity compensating RCs can also be selected and applied to the digital image using RC Look-Up Tables (LUTs), where the LUTs are generated by a linear combination of the subset of basis vectors. In accordance with another feature of the present invention, the uniformity compensating RCs are applied to the digital image as arithmetic operations forming a linear combination of basis vectors. These concepts will all be described now in more detail.

Figure 5:
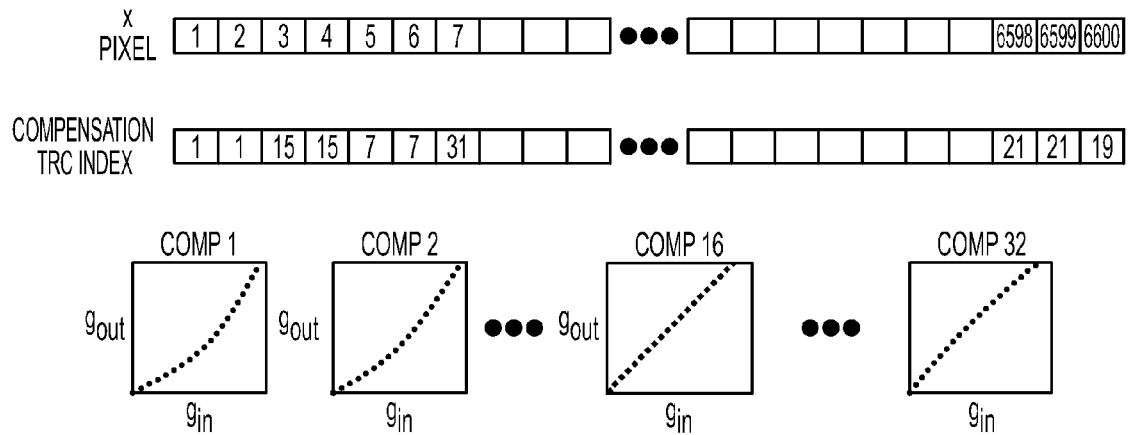
FIG. 5 illustrates a sample TRC lookup table for a set of 32 clustered TRCs with 6600 pixels in the cross process direction.

In accordance with a feature of the present invention, a pixel-position-RC LUT is used to select an RC LUT for a pixel within the digital image. In accordance with another feature of the present invention, a pixel-position-RC LUT uses the pixel column of a given pixel in the digital image as the index into the LUT. In accordance with another feature of the present invention, a pixel-position-weight LUT is used to select a basis vector weights for a given pixel within the digital image. Referring to FIG. 5, a pixel-position-RC LUT is shown together with representative graphs showing curves for LUT selections.

Figure 6:
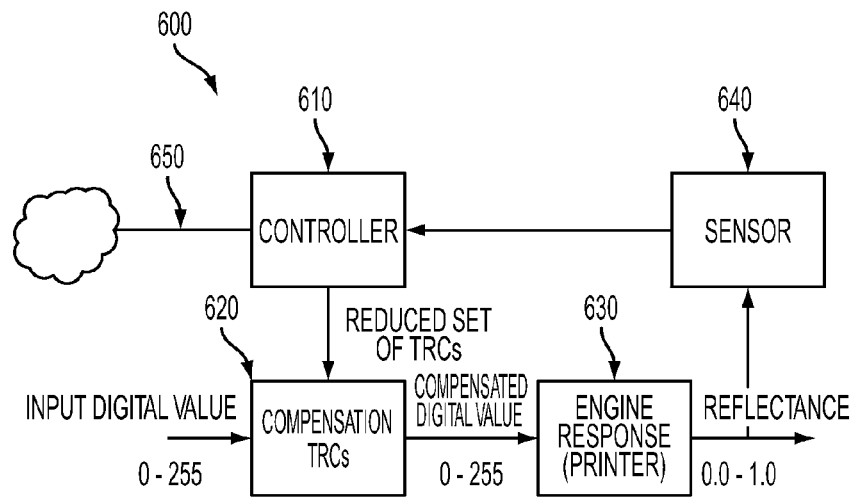
FIG. 6 illustrates a block diagram system implementation of the present invention within a real-time image path including a feedback loop focusing on RC reduction.

Referring to FIG. 6 shown is a schematic of a system 600 wherein active components are deployed to cooperate within an image path in accordance with the present invention. The system 600 includes a compensation RC compensation module 620 an engine response module (e.g., a printer) 630, a sensor 640 and a controller 610. Iterative feedback control methods are shown used in conjunction with other aspects of the invention described above in the present embodiment of the invention. The determination and application of the compensation RCs is performed by the Control module 610 in cooperation with the RC compensation module 620. The RC compensation module performs the chosen type of process (e.g., arithmetic, LUT) that will be employed to correct image streaks and overcome image nonuniformity. Reducing the number of bases reduces the computational burden of the Control module 610, as well as providing noise rejection at engine response 620. The control module 650 can receive various external inputs, such as the control strategy to use for compensation and the criteria to optimize and maintain compensation.

Singular Value Decomposition ("SVD") is a mathematical technique for analyzing a set of multivariate data. The SVD technique provides a representation of the multivariate data as a linear combination of orthonormal basis vectors, wherein each successive basis vector accounts for as much of the variation in the original data as possible. The singular values of the multivariate set of data correspond to orthonormal eigenvectors of the sample matrix ordered according to decreasing eigen values.

Performing a SVD analysis of the set of RCs gives an automatic way to separate out the measurement noise from the true RC variations. The real RC variations have some correlation as they vary across space while the noise is uncorrelated between the measured RCs. The correlated RC variations reinforce the first few singular values and therefore cause then to have a large contribution to the variation of the RC. The uncorrelated noise will be spread out over all the other singular values. Each of the higher values will be formed by noise and make small contributions to the variation of the RC. Therefore, the signal due to the real RC variations will automatically come out of the analysis when the first few values are selected for RC representation.

One technique for determining the number of singular values is to determine the percent contribution to each successive SVD value component. The present inventors have applied SVD to a set of printer spatial RCs to achieve streak compensation.

Figure 7:
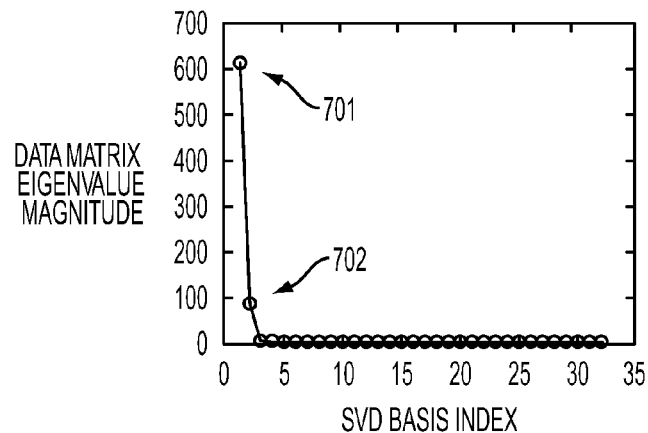
FIG. 7 illustrates a graph of data matrix eigen value magnitude for each successive SVD component for an exemplary printer.

Referring to the graph in FIG. 7, the value from each successive singular value is plotted. The graph shows that, for this example, 97% of variation is captured by the first two singular values, 701 and 702. The remaining variation might be noise caused by measurement and marking process fluctuation, and it is desired to filter out this noise. This means that only two SVD weights accurately model the engine response and should be used to reconstruct the spatial RC for each pixel column for this set of spatial RCs.

Note that SVD bases are data-dependent, as opposed to fixed (or data-independent) bases, such as cosine and sine bases. Numerical studies by the present inventors show that the quality of the approximation to the original TRC data obtained by using a small number of SVD bases is superior to the one for the same number of Discrete Cosine Transform (DCT) bases—i.e., the approximation error in L* obtained for 2 SVD bases is the same as the error obtained for 5 DCT bases. This feature is a key consideration in selection of SVD bases over fixed bases for TRC representation.

For high speed real-time image paths it is desirable to reduce the number of RCs needed for streak compensation. SVD-based representation of spatial RCs provides a very convenient way to perform this compression by clustering the SVD weights. Before SVD analysis, the non-uniformity of an 11", 600 spot/inch printer is represented by the 6600 separate RCs. After SVD analysis, each RC is described only by the weights that multiply the significant singular values. If only 2 bases are needed to describe each RC, then a point in the space where the first weight is plotted on the x-axis and the second weight is plotted on the y-axis can represent each RC. The full non-uniform response of the printer is given by all 6600 points plotted in this way in FIG. 9.

Figure 8:
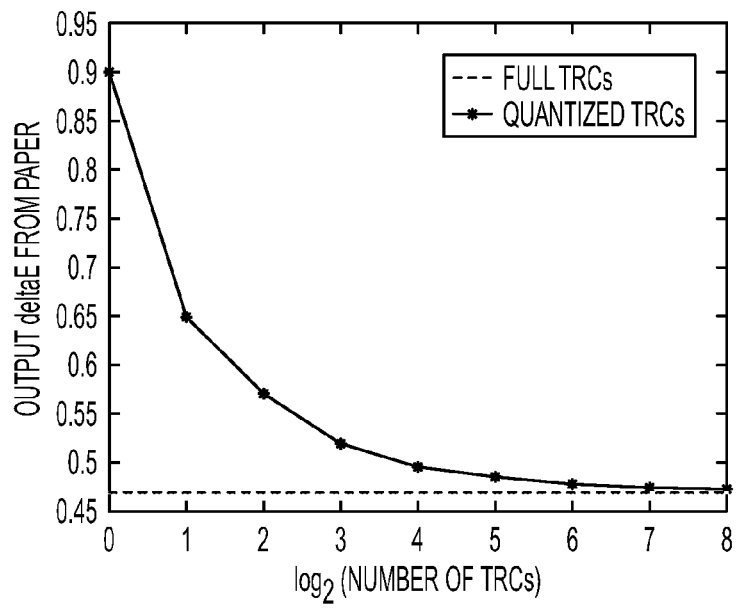
FIG. 8 illustrates a different number of clustered TRC's used in each compensation wherein the standard deviation of the uniformity profile for a plurality of strips is calculated.

Referring to the graph illustrated in FIG. 8, the first two significant SVD weights for a subject printer's magenta RCs are plotted with each set of coordinate $(w_1, w_2)$ representing one spatial TRC for each column. Each weight is output as a continuous variable from the SVD algorithm. The precision of a continuous variable may not necessarily be needed or wanted when generating inverse RCs to compensate the non-uniformity. The response of the printer can be clustered in the weight response space. The objective of a clustering algorithm is to find a set of fewer points that best span, on the average, all the points. Thus, the number of compensation RCs can be reduced by clustering the SVD weights. Clustering can be performed on the engine response RCs, or the inverse (compensation) RCs. There are many techniques that can be used to identify cluster points of a set of data and the present invention can apply a known method to the present clustering problem, such as a MATLAB™ clustering program. MATLAB™ is a product distributed by "The MathWorks". The clustering can be extended into 3 or more dimensions of more than 2 basis vectors contribute significantly to the percent variation of the RC.

Figure 9:
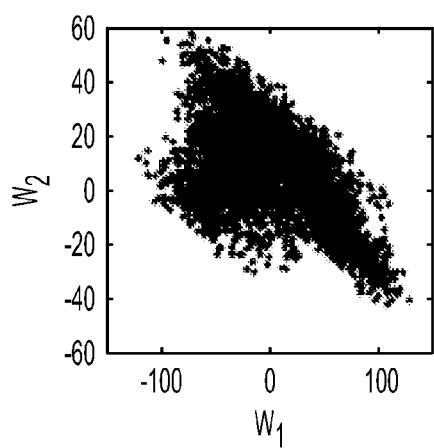
FIG. 9 illustrates a graph of 6600 first and second basis weights for an exemplary printer.
Figure 10:
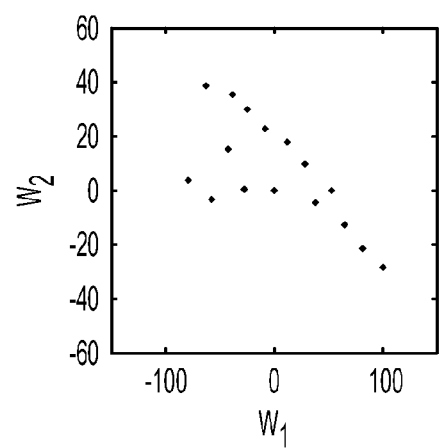
FIG. 10 Illustrates a graph wherein plots of 16 cluster centers are shown for the data set shown in FIG. 9.

Referring to FIG. 10, the 16 cluster centers for the data set shown in FIG. 9, are plotted. Any given data point in FIG. 9 can be assigned to one of the centers in FIG. 10 using certain criteria (e.g., minimum distance). The best reduced set of SVD weights can be chosen such that they thereby produce clustered RCs that span all the RCs generated by the printer.

For a given pixel column p and digital pixel value $y_{in}$ the compensated output pixel value $y_{out}$ can be written as:

$$y_{out}(y_{in}; p) = y^A_{y_{in}} + u_{1,y_{in}} w_{p,1} + u_{2,y_{in}} w_{p,2} \quad (1)$$

Mean compensation RC value: $y^A_{y_{in}}$
Value of basis vector 1 for input value $y_{in}$: $u_{1,y_{in}}$
Weight of basis vector 1 for pixel column p: $w_{p,1}$
Value of basis vector 2 for input value $y_{in}$: $u_{2,y_{in}}$
Weight of basis vector 2 for pixel column p: $w_{p,2}$ In accordance with another feature of the present invention, an aim RC could be the mean compensation RC (mean of engine response inverse), or it could be defined according to other criteria. It may not be desirable for the spatial RC module to modify the mean RC due to potential conflicts with other process controls. In some configurations it may be desirable to use an identity mapping for the Aim, so that only spatial variation is modified. To maintain generality, the following analysis below uses Aim Compensation RC and deviation from the Aim. The above equation is derived below where an aim TRC is employed in the analysis.

Compensation Spatial TRC data can be represented in an M-by-N matrix Y,
where M=number of gray levels (e.g., 256)
N=number of pixel columns in a scanline (e.g., 6600)

$$Y = \begin{bmatrix} y_{1,1} & y_{2,1} & \cdots & y_{N,1} \\ y_{1,2} & y_{2,2} & \cdots & y_{N,2} \\ \vdots & \vdots & & \vdots \\ y_{1,256} & y_{2,256} & \cdots & y_{N,256} \end{bmatrix}$$

Outboard → Inboard, Pixel columns across page. Light → Dark. Compensation RC ($\Delta L^*$ from paper) for each pixel column.

First, the Aim RC is subtracted from each local Compensation RC to get Compensation RC variation:

$$\text{Aim } TRC \ Y^A = \begin{bmatrix} y_1^A \\ y_2^A \\ \vdots \\ y_{256}^A \end{bmatrix}$$

Light → Dark. Aim Compensation RC ($\Delta L^*$ from paper).

Compensation TRC Variation $$Y' = \begin{bmatrix} y_{1,1} & y_{2,1} & \cdots & y_{N,1} \\ y_{1,2} & y_{2,2} & \cdots & y_{N,2} \\ \vdots & \vdots & & \vdots \\ y_{1,256} & y_{2,256} & \cdots & y_{N,256} \end{bmatrix} - \begin{bmatrix} y_1^A & y_1^A & \cdots & y_1^A \\ y_2^A & y_2^A & \cdots & y_2^A \\ \vdots & \vdots & & \vdots \\ y_{256}^A & y_{256}^A & \cdots & y_{256}^A \end{bmatrix} = \begin{bmatrix} y'_{1,1} & y'_{2,1} & \cdots & y'_{N,1} \\ y'_{1,2} & y'_{2,2} & \cdots & y'_{N,2} \\ \vdots & \vdots & & \vdots \\ y'_{1,256} & y'_{2,256} & \cdots & y'_{N,256} \end{bmatrix}$$

Then, singular value decomposition on Y' is performed, $$Y' = USV^T$$

where S is M-by-N matrix with singular values on the diagonal, and U and V are composed of eigenvectors.

The SVD representation can be rewritten as, $$Y' = UW = \begin{bmatrix} u_{1,1} & u_{2,1} & \cdots & u_{256,1} \\ u_{1,2} & u_{2,2} & \cdots & u_{256,2} \\ \vdots & \vdots & & \vdots \\ u_{1,256} & u_{2,256} & \cdots & u_{256,256} \end{bmatrix} \begin{bmatrix} w_{1,1} & w_{2,1} & \cdots & w_{N,1} \\ w_{1,2} & w_{2,2} & \cdots & w_{N,2} \\ \vdots & \vdots & & \vdots \\ w_{1,256} & w_{2,256} & \cdots & w_{N,256} \end{bmatrix}$$

Column 1 → Column N. Weight Vector. Basis Vector 1, Basis Vector 2, Basis Vector 256.

The complete set of spatial compensation RCs is then exactly represented by adding the Aim RC to the product of the UW matrices as follows:

$$Y = [Y_1^A \ Y^A \ \cdots \ Y^A] + UW = \begin{bmatrix} y_1^A & y_1^A & \cdots & y_1^A \\ y_2^A & y_2^A & \cdots & y_2^A \\ \vdots & \vdots & & \vdots \\ y_{256}^A & y_{256}^A & \cdots & y_{256}^A \end{bmatrix} +$$

$$\begin{bmatrix} u_{1,1} & u_{2,1} & \cdots & u_{256,1} \\ u_{1,2} & u_{2,2} & \cdots & u_{256,2} \\ \vdots & \vdots & & \vdots \\ u_{1,256} & u_{2,256} & \cdots & u_{256,256} \end{bmatrix} \begin{bmatrix} w_{1,1} & w_{2,1} & \cdots & w_{N,1} \\ w_{1,2} & w_{2,2} & \cdots & w_{N,2} \\ \vdots & \vdots & & \vdots \\ w_{1,256} & w_{2,256} & \cdots & w_{N,256} \end{bmatrix} =$$

$$\begin{bmatrix} y_1^A & y_1^A & \cdots & y_1^A \\ y_2^A & y_2^A & \cdots & y_2^A \\ \vdots & \vdots & & \vdots \\ y_{256}^A & y_{256}^A & \cdots & y_{256}^A \end{bmatrix} +$$

$$\begin{bmatrix} \sum_{i=1}^{256} u_{i,1} w_{1,i} & \sum_{i=1}^{256} u_{i,1} w_{2,i} & \cdots & \sum_{i=1}^{256} u_{i,1} w_{N,i} \\ \sum_{i=1}^{256} u_{i,2} w_{1,i} & \sum_{i=1}^{256} u_{i,2} w_{2,i} & \cdots & \sum_{i=1}^{256} u_{i,2} w_{N,i} \\ \vdots & \vdots & & \vdots \\ \sum_{i=1}^{256} u_{i,256} w_{1,i} & \sum_{i=1}^{256} u_{i,256} w_{2,i} & \cdots & \sum_{i=1}^{256} u_{i,256} w_{N,i} \end{bmatrix}$$

For noise suppression, and to aid reducing number of RCs, higher basis vectors are eliminated and higher weights are set to zero. This produces approximate, robust spatial RCs. Either engine RCs or inverse (compensation) RCs are then filtered. The mathematical process is as follows:

$$\hat{Y} = \hat{U}\hat{W} = \begin{bmatrix} \overbrace{u_{1,1} \quad u_{2,1}}^{\text{First 2 vector bases}} & 0 \ldots 0 \\ u_{1,2} & u_{2,2} & 0 \ldots 0 \\ \vdots & \vdots & \vdots & \vdots \\ u_{1,256} & u_{2,256} & 0 \ldots 0 \end{bmatrix} \begin{bmatrix} \overbrace{w_{1,1} \quad w_{2,1} \ldots w_{N,1}}^{\text{Weights for pixel columns across page}} \\ w_{1,2} \quad w_{2,2} \ldots w_{N,2} \\ 0 \quad 0 \quad 0 \\ \vdots \quad \vdots \quad \vdots \\ 0 \quad 0 \ldots 0 \end{bmatrix} \right\} \begin{array}{l} \text{First 2 weights} \\ \text{For each pixel} \\ \text{column} \end{array}$$

$$= \begin{bmatrix} u_{1,1} & u_{2,1} \\ u_{1,2} & u_{2,2} \\ \vdots & \vdots \\ u_{1,256} & u_{2,256} \end{bmatrix} \begin{bmatrix} w_{1,1} & w_{2,1} & \ldots & w_{N,1} \\ w_{1,2} & w_{2,2} & \ldots & w_{N,2} \end{bmatrix}$$

The complete set of compensation RCs can be represented by adding the Aim TRC to the product of the $\hat{U}\hat{W}$ matrices as, illustrated as follows:

$$\hat{Y} = [Y^A \quad Y^A \quad \ldots \quad Y^A] + \hat{U}\hat{W} \quad (2)$$

$$= \begin{bmatrix} y_1^A & y_1^A & \ldots & y_1^A \\ y_2^A & y_2^A & \ldots & y_2^A \\ \vdots & \vdots & & \vdots \\ y_{256}^A & y_{256}^A & \ldots & y_{256}^A \end{bmatrix} +$$

$$\begin{bmatrix} u_{1,1} & u_{2,1} \\ u_{1,2} & u_{2,2} \\ \vdots & \vdots \\ u_{1,256} & u_{2,256} \end{bmatrix} \begin{bmatrix} w_{1,1} & w_{2,1} & \ldots & w_{N,1} \\ w_{1,2} & w_{2,2} & \ldots & w_{N,2} \end{bmatrix}$$

$$= \begin{bmatrix} y_1^A & y_1^A & \ldots & y_1^A \\ y_2^A & y_2^A & \ldots & y_2^A \\ \vdots & \vdots & & \vdots \\ y_{256}^A & y_{256}^A & \ldots & y_{256}^A \end{bmatrix} +$$

$$\begin{bmatrix} u_{1,1}w_{1,1} + & & u_{1,1}w_{N,1} + \\ u_{2,1}w_{1,2} & u_{1,1}w_{2,1} + u_{2,1}w_{2,2} & \ldots & u_{2,1}w_{N,2} \\ u_{1,2}w_{1,1} + & & u_{1,2}w_{N,1} + \\ u_{2,2}w_{1,2} & u_{1,2}w_{2,1} + u_{2,2}w_{2,2} & \ldots & u_{2,2}w_{N,2} \\ \vdots & \vdots & & \vdots \\ u_{1,256}w_{1,1} + & & u_{1,256}w_{N,1} + \\ u_{2,256}w_{1,2} & u_{1,256}w_{2,1} + u_{2,256}w_{2,2} & \ldots & u_{2,256}w_{N,2} \end{bmatrix}$$

$$= \begin{bmatrix} u_{1,1}w_{1,1} + & u_{1,1}w_{2,1} + & & u_{1,1}w_{N,1} + \\ u_{2,1}w_{1,2} + y_1^A & u_{2,1}w_{2,2} + y_1^A & \cdots & u_{2,1}w_{N,2} + y_1^A \\ u_{1,2}w_{1,1} + & u_{1,2}w_{2,1} + & & u_{1,2}w_{N,1} + \\ u_{2,2}w_{1,2} + y_2^A & u_{2,2}w_{2,2} + y_2^A & \cdots & u_{2,2}w_{N,2} + y_2^A \\ \vdots & \vdots & & \vdots \\ u_{1,256}w_{1,1} + & u_{1,256}w_{2,1} + & & u_{1,256}w_{N,1} + \\ u_{2,256}w_{1,2} + y_{256}^A & u_{2,256}w_{2,2} + y_{256}^A & \cdots & u_{2,256}w_{N,2} + y_{256}^A \end{bmatrix}$$

which is a matrix representation of Eq. (1).

In accordance with another aspect of the present invention, a look up table (LUT) can be used to reference a RC to a pixel column. For a LUT implementation, computation of reduced RCs, as in Eq. (1) or Eq. (2), is performed in a controller for all p and $y_{in}$ and a $y_{in}$-$y_{out}$ LUT or an index to a LUT for each p is sent to the TRC module.

In accordance with another aspect of the present invention, an arithmetic implementation performs the RC operation. During computational implementation, an RC module stores the weights, vectors, and Aim RC, and it computes output values $y_{out}$ given p and $y_{in}$ using a mathematical form such as Eq. (1) or Eq. (2).

To test the concepts of the present invention, the spatial variation of the engine response RC was measured for a number of xerographic engines exhibiting real streaks. Further, artificial distortions in engine response were used to produce a range of RCs to study specific kinds of process direction defects such as image density skew and narrow streaks. A model of the streak compensation procedure was exercised using different conditions of clustering and numbers of basis sets. A few different image quality metrics specific to these images were devised and used to monitor the change in the streaking as the compensation was applied. Compensation was performed experimentally on a subject printer as verification that the modeled results showed reasonable behavior.

The inventors focused on memory savings and computational efficiency for pixel column-to-column engine compensation. The reduction in required memory from the present feature is great. The reduction is even greater if the dimensionality of the compensation is increased. For instance, the compensation methodology is extendable to pixels rather than columns, applied across engines, applied for different plates on a photoreceptor, applied for different printheads in a direct marking engine. In these cases an optimal RC reduction method is increasingly important.

An additional consideration for the practical impact of the present invention is that it can be performed with low effort and can be downloadable via a network connection 650.

Results have proven that between 8 and 32 compensation RCs can effectively eliminate observable streaks and bring the uniformity metrics to a reasonably low level. This means that, by using the methods and systems of the present invention, streak compensation using spatial RCs can be achieved in a very cost-effective way since implementing 8-32 RCs does not add much ASIC complexity and computation.

Referring to FIG. 8, the relation between one of the uniformity metrics and the RC clustering levels (number of RCs) is plotted as an example. In this case, streak compensation was carried out using a printer for the magenta separation. The subject printer was a 600×1200 spi LED bar color printer with severe streak artifacts. The compensation test image consisted of 256 gray level uniform strips. The uniformity metric shown in FIG. 8 is the average of the standard deviation for all the 256 strips after compensation. It can be seen from the plot that the uniformity is nearly as good with 32 clustered RCs as with using the full spatial RC set.

A simple example can be used to illustrate the typical savings in memory requirements achievable by using the present technique. Consider the case where 6600 RCs are stored with 256 gray levels each and a 1 byte output at each level. Roughly speaking, 6600×256≈1.7 MB of RC data needs to be stored. If the RCs are approximated by first using only a few SVD bases, and later clustering the SVD weights to 32 levels, only 32×256=8192 bytes of RC data will need to be stored. The present invention can give a reduction of more than 99.5% in the amount of RC data to be stored, without noticeable deterioration in the quality of the streak compensation.

The present invention has previously been described with features controlling the RCs to an aim RC given by the average TRC. A problem arises because the average TRC might not be achievable across multiple TIPP engines, or even across all pixel columns for a single engine. For instance, two engines in a TIPP architecture may not be able to achieve the same $D_{max}$, the optical density at 100% area coverage. The inability to achieve the aim RC can result in poorer uniformity across the field and across engines, and/or could increase the number of iterations required for convergence.

Figure 11:
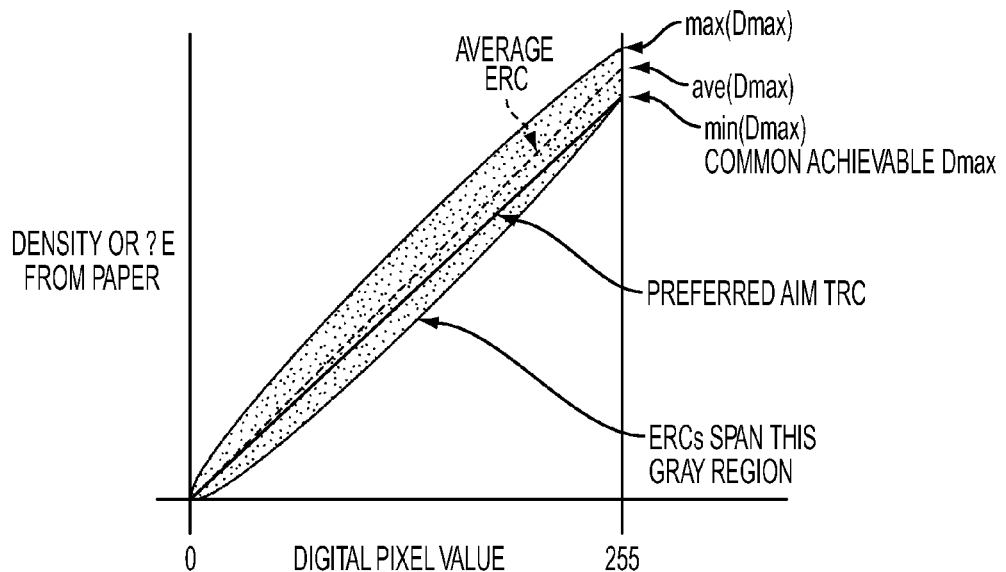
FIG. 11 illustrates a graph of RCs, average RC, and an example of a preferred Aim RC for an exemplary printer.

Referring to FIG. 11, another embodiment of the present invention is illustrated where a particular Aim TRC $D_{max}$ is established and use in a control loop setting where multiple RCs are adjusted towards this aim. A key aspect of this embodiment is use of the minimum $D_{max}$ when setting the high-density point.

Another embodiment of the present invention is also illustrated in FIG. 11. Some printers are not robust to producing low area coverages. The lowest area coverage that can be produced in a stable manner is defined as $D_{min}$. $D_{min}$ across the process direction is determined. The darkest $D_{min}$ is used as the end point for the aim TRC.

Consider the single printer RC scenario, where the $D_{max}$ of the Aim RC is set. Although the focus here is on $D_{max}$, there is a related concept for $D_{min}$. FIG. 11 illustrates a conceptual span of single engine response RCs as the shaded region, an average engine response RC, and a preferred Aim RC. The span of RCs could be the focus of TRCs across a single page, or across multiple pages as the response of the printer drifts in time. Ave($D_{max}$) is mentioned as setting the Aim RC in previous work, but it should be noted that a printing region that can only achieve min($D_{max}$) cannot achieve Ave($D_{max}$), hence Ave($D_{max}$) should not be used in setting the high-density point in the Aim TRC. Only min($D_{max}$) is commonly achievable and should be used to set the high-density point in a TRC control loop.

An example of a preferred Aim RC is shown only to indicate the significant difference to the average engine response RC at the high-density end. Other shaping factors may be used at densities other than $D_{max}$ for other considerations. For instance, a rounded shoulder and toe often provides some improved shadow and toe performance. In addition, gray balance RCs may be used to establish the Aim RC for a significant portion of the gray range.

Figure 12:
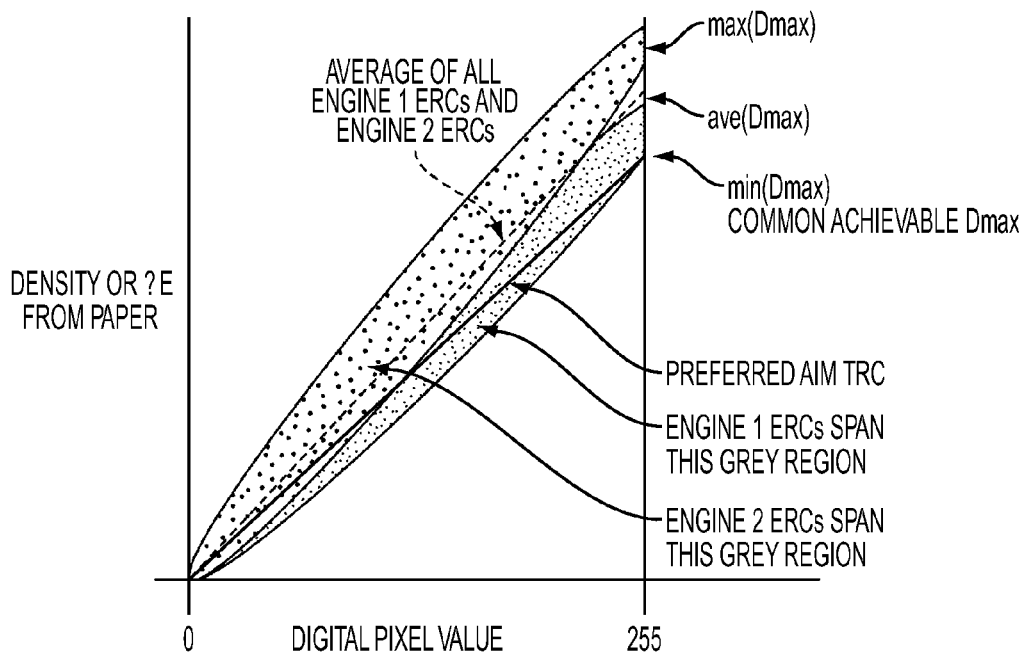
FIG. 12 illustrates a graph of RCs of two print engines within a TIPP architecture, average RC, and an example of a preferred Aim RC.

Referring to FIG. 12, the problem becomes more pronounced when using multiple engines, such as in a TIPP architecture. It is more likely that two print engines will differ more significantly in $D_{max}$ than a single print engine. The arguments for using min($D_{max}$) in constructing the Aim RC are the same as above.

Also referring to FIG. 12, the problem also can become pronounced when using multiple print heads in a direct marking printer. It is more likely that two print heads will differ more significantly in $D_{max}$ than a single print head. The arguments for using min($D_{max}$) in constructing the Aim RC are also the same as above.

An additional consideration arises when considering Gray Balance and multiple engines, such as in a TIPP architecture. The individual engines may require different Gray Balance RCs to achieve good neutrals, but the $D_{max}$ for those different Aim RCs should still be chosen according to the present invention.

A similar strategy could be used for $D_{min}$, where the key density level is the first one above paper density (e.g., D1 where paper is $D_0$ or $D_{min}$). In that case, max(D1) would be commonly achievable. We did not experiment with D1 and do not believe it is as critical as $D_{max}$ because the absolute $D_{min}$ (D0) is limited by the paper across a print and print-to-print, whereas the absolute $D_{max\ x}$ is limited by many xerographic variables.

Matching $D_{min}$ between printers can be achieved in another way. Consider two printers, Printer A that is able to print at ΔE=0.2 from paper at the first halftone level, and Printer B that is able to print ΔE=0.1 from paper at the first halftone level. ΔE is a measure of color difference in color space. Specifically, it is the Euclidean distance in L*a*b* space. It should be appreciated that lightness alone (L*) could be used, as well as some other measure of color difference. Instead of forcing printer B to start printing at a denser halftone that gives ΔE=0.2, one can apply two spatial TRC that alternates rapidly as a function of position in the cross process direction. The first RC prints the lowest level at ΔE=0.2, and the second RC prints nothing for this level. Then, if one applies this correctly in order to not have any halftone structure effects, the lower ΔE=0.1 can be achieved by averaging. This technique can be generalized and achieved via feedback-based iterative methods for any values of ΔE.

Figure 13:
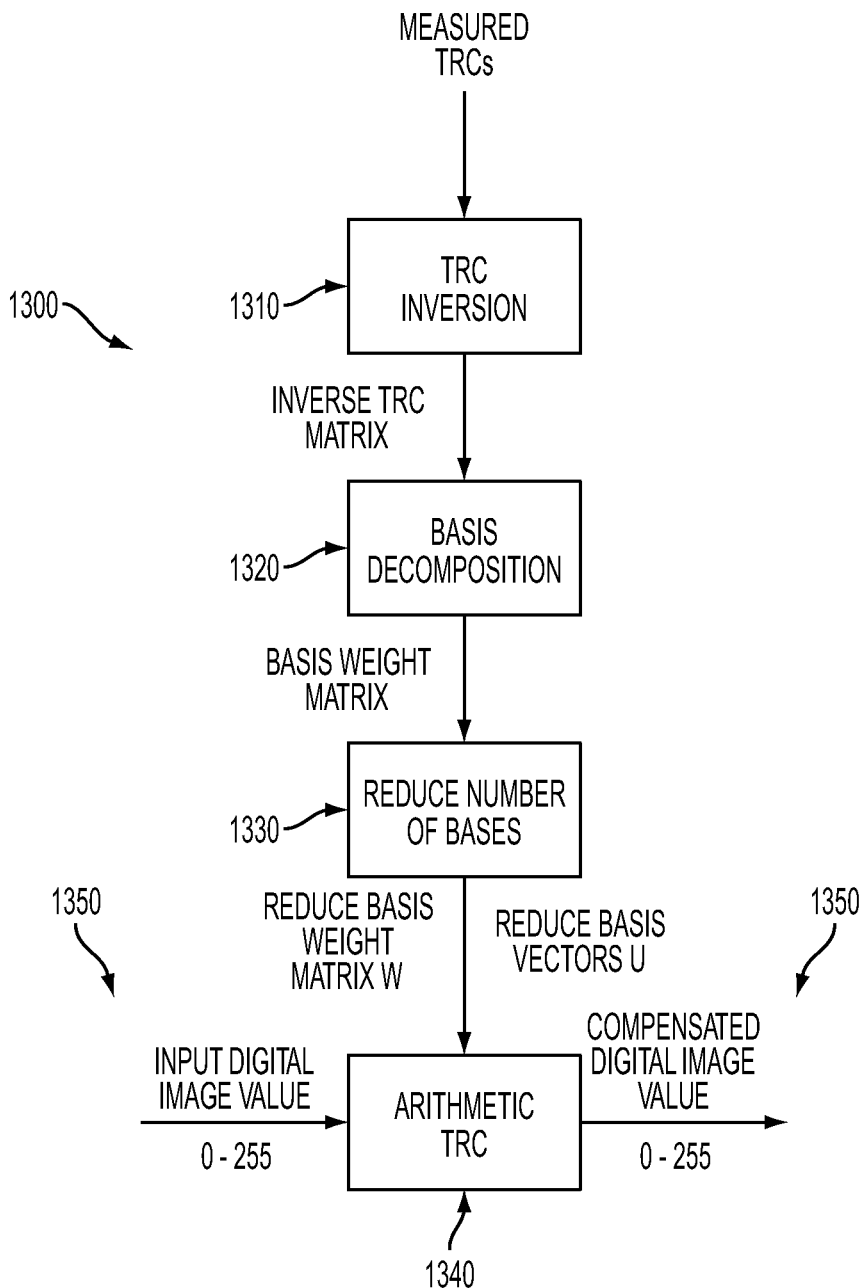
FIG. 13 illustrates a block diagram schematic of another embodiment of the present invention.

Referring to FIG. 13, a system 1000 in accordance with an alternate embodiment of the invention is illustrated. In the alternative embodiment of the present invention a low-memory, non-LUT technique is used within a system to implement spatial RC-based compensation of streaks via arithmetic operations, where the number of arithmetic operations is minimal. The non-LUT can be implemented within a controller as described in FIG. 6, and includes a RC inversion module 1010, a singular value analysis (SVD) module 1020, a reduce number of basis arithmetic module 1030, and an arithmetic RC implementation module 1040 shown within a control path 1050.

The technique can be used in a real-time image path 1050 with a uniformity correction control loop as further shown in FIG. 13, and includes 3 steps. (1) Use Singular Value Decomposition (SVD) 1020 to represent each unique RC as a weighted combination of basis vectors. (2) Approximate the TRCs 1030 by selecting the first few basis vectors. (3) Compute the appropriate compensation on-line 1040, by performing the multiply-and-add arithmetic operations using the selected SVD bases and corresponding weights. The approximation in step (2) reduces computation, and also provides robustness with respect to process and measurement noise.

Reducing the number of SVD basis vectors minimizes the sensitivity to measurement and marking noise, and minimizes computational requirements in a controller that is generating the RCs. The singular value weights of the spatially varying RCs indicate the amount of RC deviation from the mean that can be determined from each component. For typical print reflectance data, it is found that the first few basis vectors provide a suitably accurate approximation to the engine RC while providing a degree of noise rejection. This approximation reduces the dimensionality of the original RC data from the number of gray levels (e.g., b=256) to the number of SVD components selected (e.g., b=2 or 3).

The invention claimed is:

1. A method for streak compensation in at least one printer, comprising the steps of:
    measuring a collection of spatial Response Curves (RCs) over a space of desired uniformity utilizing a linear array sensor;
    identifying an RC min(Dmax) for said collection of RCs across a plurality of pixel columns, wherein said RC min(Dmax) is the lowest common achievable Dmax across said multiple digital printers;
    performing a singular value decomposition (SVD) analysis on said collection of RCs to produce a linear combination of basis vectors;
    selecting a subset of said basis vectors to represent said RCs according to a percent variability of engine response curve contributed by each of said basis vectors wherein K is the number of basis vectors in said subset;
    determining SVD weights for said selected basis vectors, wherein pixel values are inputted into
    $$y_{out}(y_{in};p) = y_{y_{in}}^{A} + u_{1,y_{in}} w_{p,1} + u_{2,y_{in}} w_{p,2} + \ldots + u_{K,y_{in}} w_{p,K}$$
    to produce compensated pixel values, wherein p=a pixel column, u=value of one of said basis vectors and w=weight of one of said basis vectors;
    constructing compensating RCs from said subset of RCs, said RC min(Dmax) and said SVD weights utilizing a controller;
    reducing the number of compensating RCs by clustering said SVD weights; and
    applying said compensating RCs to a digital image in an image path of said at least one digital printer.

2. The method of claim 1 further comprising iteratively updating said compensating RCs to said digital image based on an updated measurement of the compensating RCs.

3. The method of claim 2 wherein said compensating RCs are applied to said digital image within a uniformity correction control loop.

4. The method of claim 1 wherein RC look-up tables (LUTs) are generated by a linear combination of said subset of basis vectors and said compensating RCs are applied to said digital image utilizing said RC LUTs.

5. The method of claim 4 wherein a pixel-position-RC is used to select a RC LUT for a given pixel within said image.

6. The method of claim 5 wherein said pixel-position-RC utilizes a pixel column of said given pixel as an index into said RC LUT.

7. The method of claim 1 wherein said compensating RCs are applied to said digital image utilizing arithmetic operations.

8. A non-transitory computer-usable medium for active streak compensation in at least one printer, said computer-usable medium embodying computer program code, said computer program code comprising computer executable instructions configured for:
    measuring a collection of spatial Response Curves (RCs) over a space of desired uniformity utilizing a linear array sensor;
    identifying an RC min(Dmax) for said collection of RCs across a plurality of pixel columns, wherein said RC min(Dmax) is the lowest common achievable Dmax across said multiple digital printers;
    performing a singular value decomposition (SVD) analysis on said collection of RCs to produce a linear combination of basis vectors;
    selecting a subset of said basis vectors to represent said RCs according to a percent variability of engine response curve contributed by each of said basis vectors wherein K is the number of basis vectors in said subset;
    determining SVD weights for said selected basis vectors, wherein pixel values are inputted into
    $$y_{out}(y_{in};p) = y_{y_{in}}^{A} + u_{1,y_{in}} w_{p,1} + u_{2,y_{in}} w_{p,2} + \ldots + u_{K,y_{in}} w_{p,K}$$
    to produce compensated pixel values, wherein p=a pixel column, u=value of one of said basis vectors and w=weight of one of said basis vectors;
    constructing compensating RCs from said subset of RCs, said RC min(Dmax) and said SVD weights utilizing a controller;
    reducing the number of compensating RCs by clustering said SVD weights; and
    applying said compensating RCs to a digital image in an image path of said at least one digital printer.

9. The non-transitory computer-usable medium for active streak compensation of claim 8 wherein said compensating RCs are applied to said digital image within a uniformity correction control loop.

10. The non-transitory computer-usable medium for active streak compensation of claim 8 wherein RC look-up tables (LUTs) are generated by a linear combination of said subset of basis vectors and said compensating RCs are applied to said digital image utilizing said RC LUTs.

11. The non-transitory computer-usable medium for active streak compensation of claim 10 wherein a pixel-position-RC is used to select a RC LUT for a given pixel within said image.

12. The non-transitory computer-usable medium for active streak compensation of claim 11 wherein said pixel-position-RC utilizes a pixel column of said given pixel as an index into said RC LUT.

13. The non-transitory computer-usable medium for active streak compensation of claim 8 wherein said compensating RCs are applied to said digital image utilizing arithmetic operations.

14. A system for active streak compensation in at least one digital printer comprising:
    a linear array sensor configured to measure a collection of spatial Response Curves (RCs) over a space of desired uniformity;
    a RC compensation module configured to performing a singular value decomposition (SVD) analysis on said collection of RCs to produce a linear combination of basis vectors and to identify an RC min(Dmax) for said collection of RCs across a plurality of pixel columns, wherein said RC min(Dmax) is the lowest common achievable Dmax across said multiple digital printers;
    said RC compensation module further configured to determine SVD weights for said selected basis vectors and approximate said spatial RCs by selecting a first few basis vectors, wherein pixel values are inputted into
    $$y_{out}(y_{in};p) = y_{y_{in}}^{A} + u_{1,y_{in}} w_{p,1} + u_{2,y_{in}} w_{p,2} + \ldots + u_{K,y_{in}} w_{p,K}$$
    to produce compensated pixel values, wherein p=a pixel column, u=value of one of said basis vectors and w=weight of one of said basis vectors; and
    a controller configured to:
        select a subset of RCs from said set of approximated spatial RCs according to a percent variability of engine response curve contributed by each of said basis vectors;
        construct compensating RCs from said subset of RCs, said RC min(Dmax) and said SVD weights utilizing a controller;
        reducing the number of compensating RCs by clustering said SVD weights; and apply said compensating RCs to an image in a real-time image path of said at least one digital printer.

15. The system of claim 14 wherein said compensating RCs are applied to said image utilizing arithmetic operations.

16. The system of claim 14 wherein said compensating RCs are applied to said image utilizing RC Look-Up Tables (LUTs).

* * * * *

UNITED STATES PATENT AND TRADEMARK OFFICE
CERTIFICATE OF CORRECTION

PATENT NO. : 8,705,120 B2
APPLICATION NO. : 12/786694
DATED : April 22, 2014
INVENTOR(S) : Yeqing Juliet Zhang et al.

It is certified that error appears in the above-identified patent and that said Letters Patent is hereby corrected as shown below:

Title Page:
Item (75), line 1, Inventor, please delete "Yequing" and insert therefore -- Yeqing --.

Signed and Sealed this
Twenty-fourth Day of June, 2014

Michelle K. Lee
*Deputy Director of the United States Patent and Trademark Office*